UNITED STATES PATENT OFFICE.

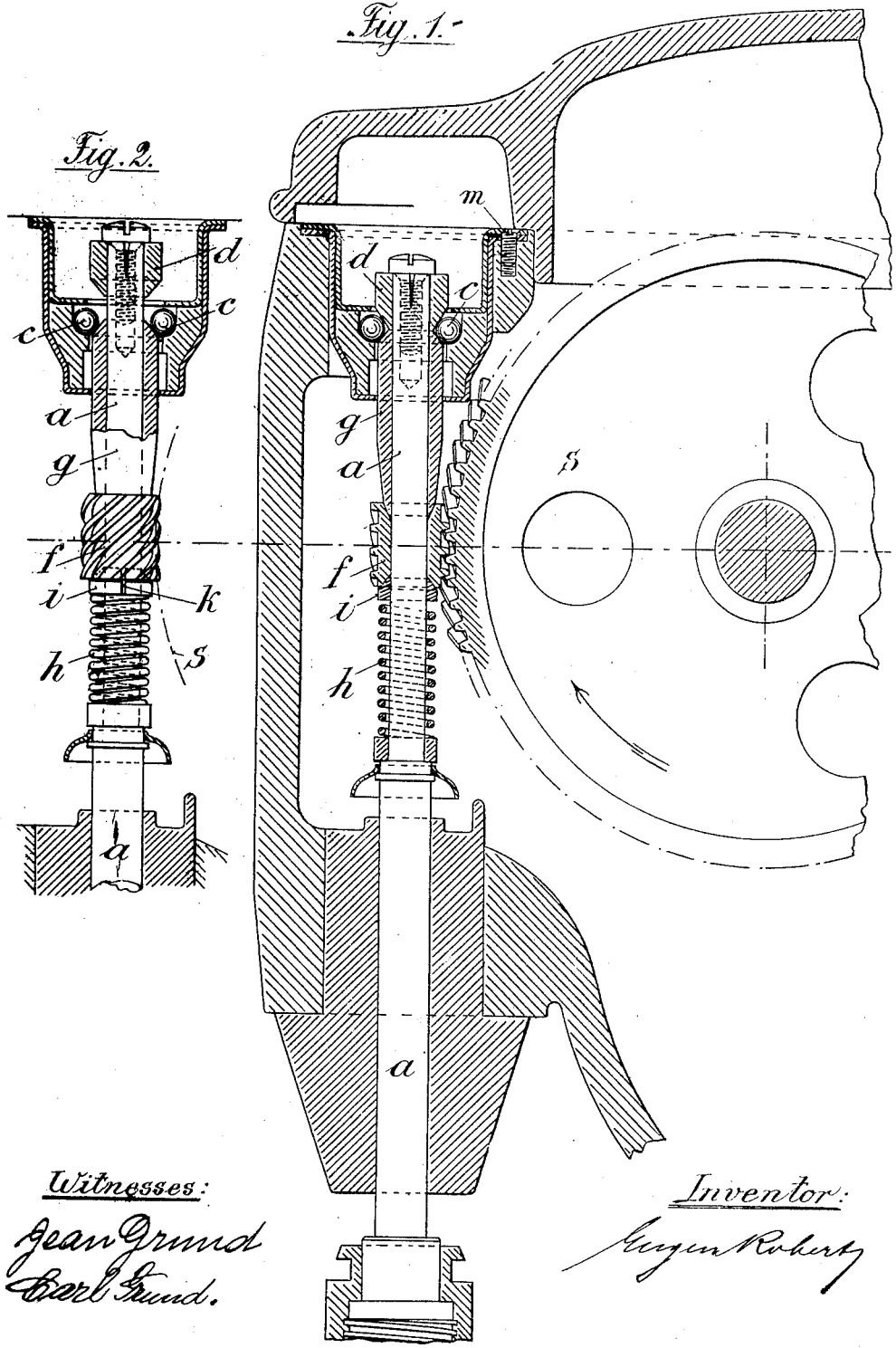

EUGEN ROBERT, OF FRANKFORT-ON-THE-MAIN, GERMANY.

GEARING.

No. 833,088.   Specification of Letters Patent.   Patented Oct. 9, 1906.

Application filed February 15, 1906. Serial No. 301,236.

*To all whom it may concern:*

Be it known that I, EUGEN ROBERT, a subject of the German Emperor, residing at Frankfort-on-the-Main, in the Kingdom of Prussia and German Empire, have invented new and useful Improvements in Gearing, of which the following is a specification.

In centrifugal cream-separators of the type in which the drum is driven by means of a worm and worm-wheel it is a common practice to mount the worm on the drum-shaft, which hangs in a ball-bearing, in such manner that the worm is free to turn on the shaft, but can be coupled with it by a friction-clutch. A defect of such separators is that in consequence of the sudden shocks which the rapidly-rotating drum experiences the teeth, especially those of the worm-wheel, frequently break off, since the drum-shaft transmits the shock to the worm and the teeth of the worm-wheel. Furthermore, the clutch-spring, located above the worm, owing to the pressure exerted upon it through the direction of rotation of the worm-wheel, is unequally influenced. The worm-teeth accordingly wear down rapidly, since by reason of the trembling motion of the yielding spring they execute an up-and-down movement between the teeth of the wheel.

All the above drawbacks are overcome by means of the driving-gear forming the subject of my invention.

The essential features of the new gear are, first, that the drum-shaft is mounted so as to slide in the worm, which itself is held in an invariable position; secondly, that the worm is caused to bear against the ball-bearing (which carries the drum and drum-shaft) with the aid of a sleeve, which may be independent of the worm or be formed in one piece therewith; thirdly, that the rotation of the drum-shaft is effected with the aid of a friction or toothed clutch actuated by a spring, which clutch may be applied above the worm, between it and the sleeve, or, in the case of the worm and sleeve being in one piece, at the bottom of the worm, or a friction or toothed clutch may be furnished at both ends of the worm. With such driving-gear the shocks of the drum, which cause a jerking rising motion of the shaft, are taken up by the ball-bearing and diminished by the spring, while the worm always retains its working position—that is to say, can neither cause shocks in the teeth nor execute up-and-down vibrations.

My invention is illustrated in the accompanying drawings, in which—

Figure 1 is a longitudinal sectional view of the new driving-gear, showing the drum-shaft in the ordinary working position. Fig. 2 is a sectional view showing the device with the shaft raised, owing to a shock taking place.

The drum-shaft $a$, to the bottom end of which the drum is secured, hangs, as ordinarily, in the ball-bearing $c$ on the conical head $d$, secured to the top end of the shaft. $f$ is the worm, which sits loosely on the shaft $a$. It is held in position, however, by means of a sleeve $g$, which bears against the ball-bearing secured in the machine-frame by screws $m$ or the like, the worm being acted upon by a spring $h$, the other end of which bears against a collar on the shaft $a$. Between the spring $h$ and the worm $f$ there is provided a clutch-ring $i$, which is peripherally slit at $k$ and engages with the worm by means of conical friction-contact surfaces. There may be a like connection between the worm and the sleeve $g$, or the two latter parts may be made in one piece. The shaft $a$ can slide within the worm $f$, sleeve $g$, and ring $i$; but on rotation of the worm by the worm-wheel $s$ it will be carried round, owing to the friction which the shaft experiences at its periphery, in the split-clutch ring $i$, which will tightly grip the shaft on account of its conical end, by reason of the pressure of the spring $h$, being forced tightly into the worm. The connection of the shaft $a$ with the worm $f$, sleeve $g$, or ring $i$ in such manner that though the shaft is capable of sliding in the said parts it cannot turn therein is not to be recommended, since in that case commencement of driving by means of the worm-wheel $s$ would be rendered much more difficult. If, on the other hand, the parts on commencing driving turn on the shaft $a$ rotation of the latter takes place gradually through friction and the speed of rotation likewise increases gradually.

Should the drum during working from any cause experience a shock, the shaft, depending upon the extent of the obstruction, will rise more or less. This, however, does not have any effect on the worm, as it would in ordinary driving gears, for, as Fig. 2 shows, the shaft sliding in the worm rises somewhat above the ball-bearing $c$, while the latter with the aid of the sleeve $g$ will retain the worm $f$ in its working position. At the same time the spring $h$ will be correspondingly compressed, whereby also the shock will be weakened. The binding of the clutch-ring $i$ on the shaft $a$, while being sufficient to cause a rotation of the said shaft, will not interfere with the rising and falling movements of the shaft or automatic action of the latter to compensate for shocks above set forth, because when the worm-wheel $s$ rotates the full relative speed set up between the same and the worm $f$ may not be imparted to the shaft $a$ when the separator starts. During the operation of the shaft $a$, which may be gradual at first, the drum will have a certain increasing momentum imparted thereto, and as this momentum increases gradually the binding of the clutch-ring $i$ on the shaft $a$ is not any greater than it was in the starting movement of the mechanism, but in point of fact is sufficient only to insure a rotation of the shaft $a$, though said shaft may not have a speed of rotation proportionate to the dimensions of the worm-wheel $s$ and worm $f$, or, in other words, may not be similar to a speed of rotation in apparatus of this class having the worm fast to the shaft. Therefore a release will ensue when the drum has acquired an increase in momentum and a shock is imparted to said drum and which will allow the shaft $a$ to rise by a quick movement or slip through the ring $i$, worm $f$, and sleeve $g$ and occupy the position shown by Fig. 2. When the effect of the shock has ceased, the shaft will again gravitate, owing to the weight of the drum, the weight of the drum tending always to draw the shaft down to normal position, as illustrated by Fig. 1. It must not be understood that the ring $i$ is pushed upwardly into the lower extremity of the worm $f$ by the spring $h$ with such force as to tightly contract the ring and cause it to bind on the shaft or to establish a full jam between the upper conical surface of the ring and the lower end of the worm, only such degree of frictional engagement of the ring with respect to the worm being maintained as to set up a rotation of the shaft $a$.

With the new driving-gear, therefore, all danger of the teeth breaking through shocks is practically overcome and the wear of the worm essentially diminished.

Having thus described my invention, I claim as new—

1. In a gearing, in combination a vertically-sliding drum-shaft; a ball-bearing, carried by the machine-frame, in which the shaft is suspended; a worm mounted on the shaft and bearing against the ball-bearing; a spring-actuated clutch mounted on the shaft and coupling it with the worm; and a worm-wheel meshing with the worm; all operating in such manner that on the separator-drum experiencing a shock, the shaft rises, while the worm is held in its invariable working position on the shaft by the bearing and the clutch; substantially as described.

2. In a gearing, in combination a vertically-sliding drum-shaft; a ball-bearing, carried by the machine-frame, in which the shaft is suspended; a worm loosely mounted on the shaft; a loose sleeve on the ball-bearing, which sleeve presses against the ball-bearing, while the bottom is coupled with the top of the worm; a spring-actuated split clutch on the shaft, coupling it with the bottom of the worm; and a worm-wheel meshing with the worm; all operating substantially as described.

3. A frame or support having a ball-bearing, a shaft suspended from said ball-bearing, a sleeve placed loosely about the shaft and seated against the ball-bearing, a worm placed loosely about the shaft and seated against the sleeve, a clutch-ring about the shaft, and a spring for moving the ring to the worm, said clutch-ring being adapted to grip the shaft and rotate the same while allowing the shaft to slide longitudinally independently of the ring and worm.

In testimony whereof I have hereunto set my hand in the presence of two subscribing witnesses.

EUGEN ROBERT.

Witnesses:
JEAN GRUND,
CARL GRUND.